United States Patent
Parrish, IV

[11] Patent Number: 6,045,095
[45] Date of Patent: Apr. 4, 2000

[54] VANE-AIRFOIL COMBINATION

[76] Inventor: Overton L. Parrish, IV, 4206 Capstone Dr., Carrollton, Tex. 76436

[21] Appl. No.: 09/159,153

[22] Filed: Sep. 23, 1998

[51] Int. Cl.[7] .................................................. B64C 21/04
[52] U.S. Cl. ........................... 244/198; 244/201; 244/217; 244/45 A
[58] Field of Search ................................... 244/198, 201, 244/204, 206, 214, 217, 48, 45 A

[56] References Cited

U.S. PATENT DOCUMENTS

| | | | |
|---|---|---|---|
| 1,714,609 | 5/1929 | Massey | 244/198 |
| 1,787,321 | 12/1930 | Orr | 244/198 |
| 1,858,341 | 5/1932 | Richart | 244/198 |
| 1,876,635 | 9/1932 | Deutscher | 244/198 |
| 1,896,336 | 2/1933 | Vaile | 244/198 |
| 1,913,169 | 6/1933 | Martin | 244/198 |
| 1,927,535 | 9/1933 | Zaparka | 244/14 |
| 1,936,179 | 11/1933 | Thruston | 244/198 |
| 2,026,482 | 12/1935 | Mattioli | 244/12 |
| 2,532,899 | 12/1950 | Dubost | 170/1.5 |
| 2,938,680 | 5/1960 | Green et al. | 244/42 |
| 2,990,140 | 6/1961 | Mazelsky | 244/42 |
| 3,092,354 | 6/1963 | Alvarez-Calderon | 244/10 |
| 3,831,885 | 8/1974 | Kasper | 244/40 |
| 4,381,091 | 4/1983 | Pegram | 244/87 |
| 4,422,606 | 12/1983 | Munroe | 244/203 |
| 4,429,843 | 2/1984 | Thompson | 244/199 |
| 4,976,349 | 12/1990 | Adkins | 244/198 |
| 5,180,119 | 1/1993 | Picard | 244/10 |
| 5,901,925 | 5/1999 | McGrath et al. | 244/45 A |

*Primary Examiner*—J. Woodrow Eldred
*Attorney, Agent, or Firm*—Smith & Danamrai, P.C.

[57] ABSTRACT

A vane-airfoil combination for shifting forces associated with an airfoil. The vane-airfoil combination includes an airfoil moving through a fluid, such as air. A plurality of vanes is positioned in front of the airfoil to divert the path of the fluid to the airfoil. The change in the path of the fluid rotates the forces associated with the airfoil in relation to the original path of the fluid. Specifically, a lift force is rotated to provide a thrust component force, as well as a lift component force. In addition, a drag force is rotated to provide a lift component force, as well as a reduced drag component force. The airfoil may be any type of airfoil, such as a rotating cylinder. The vane-airfoil combination may also include a fore-body and an after-body for reducing the pressure along an upper portion of the airfoil.

21 Claims, 7 Drawing Sheets

VANE-AIRFOIL COMBINATION

BACKGROUND OF THE INVENTION

1. Technical Field of the Invention

This invention relates to airfoils, and more particularly, to an airfoil utilizing vanes to divert an oncoming airflow onto the airfoil.

2. Description of Related Art

Airfoils have been in use for many years on such vehicles as airplanes, automobiles, and boats. Airfoils are used to produce lift by traveling through the air. However, with this lifting force is accompanied a drag force. Many different designs of airfoils have been developed to increase the lifting force, as well as decrease the drag force of the airfoil. The drag force of an airfoil is broadly classified as either parasitic drag or induced drag. Parasitic drag includes all drag created by the airfoil, except that drag directly associated with the production of lift. Parasitic drag is created by the disruption of the flow of air around the airfoil's surfaces. Induced drag is the main by-product of the production of lift. It is directly proportional to the angle of attack of the wing and the amount of lift produced. Designers of airfoils have sought to balance the need for increasing lift with the requirement to reduce drag on the airfoil. The only way to reduce the total drag forces, without decreasing the lifting forces on an airfoil, is to reduce parasitic drag. Reducing induced drag, at a positive angle of attack, requires a proportional decrease in lift upon the airfoil.

Although there are no known prior art teachings of a solution to the aforementioned deficiency and shortcoming such as that disclosed herein, prior art references that discuss subject matter that bears some relation to matters discussed herein are U.S. Pat. No. 1,714,609 to Massey (Massey), U.S. Pat. No. 1,787,21 to Orr (Orr), U.S. Pat. No. 1,858,341 to Richart (Richart), U.S. Pat. No. 1,927,535 to Zaparka (Zaparka), and U.S. Pat. No. 4,429,843 to Thompson (Thompson).

Massey discloses a first airfoil mounted slightly forward and above a second airfoil. Massey also discloses a rotating cylinder drum positioned adjacent the leading edges of the first and second airfoils. Between the first and second airfoils is a slot providing a passageway for an airflow over the airfoil and cylinder drum. The passageway causes an increase in velocity of the airflow over an upper portion of the second airfoil, resulting in an increased lifting force upon the second airfoil. The rotating cylinder drum also decreases the velocity of the airflow on the lower portion of the second airfoil. Although Massey discloses diverting the airflow about the airfoil, Massey does not teach or suggest utilizing a plurality of vanes to achieve this diversion of airflow. Additionally, Massey does not show rotating an airfoil's lift or drag forces to a different direction.

Orr discloses a main wing having an upper airfoil and a lower airfoil located in front of a leading edge of the main wing. The upper airfoil and main wing form a first opening for compressing an airflow flowing over the main wing. As the airflow exits the opening, the airflow spreads outward and upwardly, causing a negative pressure on an upper side of the main wing. Additionally, the lower airfoil and main wing form a second opening which causes a downward movement of the airflow on the lower portion of the main wing. Although Orr discusses diverting the airflow over the airfoil, Orr does not teach or suggest utilizing a plurality of vanes to divert the airflow. In addition, Orr does not disclose rotating the airfoil's lift and drag forces in a different direction.

Richart discloses a wing having a ceiling keel located on an upper portion of the wing and extending approximately parallel to the normal line of flight of the wing. Beneath the ceiling keel is a plurality of vanes arranged in tandem to form the body of the wing. Air channels are formed between the plurality of vanes leading to a passageway above the plurality of vanes and below the ceiling keel. The airflow through the plurality of vanes is compressed, causing an increase in pressure which is relieved through the passageway formed above the plurality of vanes and out through the trailing edge of the wing. Richart, however, does not teach or suggest utilizing the vanes to rotate the forces associated with the airfoil to a different direction.

Zaparka discloses a main wing having a rotating moveable sustaining cylinder attached to the upper surface of the main wing. The rotation of the cylinder produces a lifting force and improves the overall lifting efficiency of the main wing. Zaparka does not teach or suggest utilizing vanes to divert the airflow about the airfoil, nor does Zaparka show rotating the resultant forces of the airfoil to a different direction.

Thompson discloses a device for enhancing the lift capability of an aircraft wing. The device includes a main wing having at least one forward projection finger member mounted on the leading edge of the main wing. The finger generates counter-rotating vortices, which trail across the upper surface of the main wing behind the finger. The vortices create a blockage effect which modifies the airflow patterns across the wing and produces an increase in lift. However, Thompson does not teach or suggest diverting the airfoil's forces through the diversion of the airflow, rather, Thompson merely discloses increasing the lifting forces upon the main wing.

Review of each of the foregoing references reveals no disclosure or suggestion of an airfoil such as that described and claimed herein. Thus, it would be a distinct advantage to have an airfoil which rotates its lift and drag forces to a different and more beneficial direction. It is an object of the present invention to provide such an apparatus.

SUMMARY OF THE INVENTION

In one aspect, the present invention is an apparatus for altering a flow of a fluid stream around an airfoil. The apparatus includes an airfoil having an orientation angle relative to the horizon and an angle of attack relative to the fluid stream. The apparatus also includes a plurality of vanes movably mounted in front of the airfoil which divert the fluid stream to change the angle of attack of the airfoil.

In another aspect, the present invention is an apparatus for altering a flow of a fluid stream around an airfoil. The apparatus includes an airfoil having an orientation angle relative to the horizon and an angle of attack relative to the fluid stream. In addition, the apparatus includes a plurality of vanes axially aligned and rotatably mounted parallel to the leading edge of the airfoil. The vanes rotate to divert the fluid stream to change the angle of attack of the airfoil. The apparatus also includes a fore-body mounted in front of the plurality of vanes which diverts the fluid stream around the airfoil to decrease high pressure formations on the airfoil.

In still another aspect, the present invention is an apparatus for altering a flow of a fluid stream around an airfoil. The apparatus includes an airfoil having an orientation angle relative to the horizon and an angle of attack relative to the fluid stream. The apparatus includes a plurality of vanes axially aligned and rotatably mounted parallel to the leading edge of the airfoil. The vanes rotate to change the angle of attack of the airfoil without changing the orientation angle of the airfoil. The apparatus also includes a fore-body mounted in front of the plurality of vanes which diverts the fluid stream around the airfoil to decrease high pressure formations from forming on the airfoil and an after-body mounted in back of the airfoil which streamlines the fluid stream behind the airfoil.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

An airfoil having a plurality of vanes to divert an oncoming airflow onto the airfoil is disclosed. The airfoil may be used on a variety of vehicles, such as automobiles, trucks, boats, and aircraft (e.g., airplanes, para-gliders, and ultra-lights).

Figure 1:
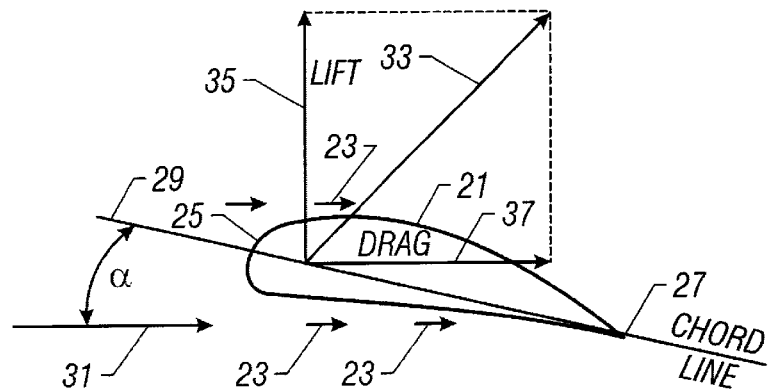
FIG. 1 (Prior Art) is a side view of an existing airfoil illustrating aerodynamic forces associated with the airfoil while traveling through a fluid.

FIG. 1 is a side view of an existing airfoil 21 illustrating aerodynamic forces associated with the airfoil 21 while traveling through a fluid. The existing airfoil 21 is any surface, such as a wing, which provides an aerodynamic force when it interacts with a moving stream of fluid, such as an airflow 23. The existing airfoil 21 includes a leading edge 25, a trailing edge 27, and a chord line 29. The leading edge 25 is that part of the existing airfoil 21 which meets the airflow 23 first. The trailing edge is that portion of the existing airfoil 21 where the airflow 23 over an upper surface of the existing airfoil rejoins a lower surface airflow 23. The chord line 29 is an imaginary straight line between the leading edge 25 and the trailing edge 27. The direction of the airflow 23 is a relative wind 31. The angle between the chord line 25 and the relative wind 31 is the angle of attack $\alpha$ of the existing airfoil 21. A total aerodynamic force is created by movement of the airflow 23 over the existing airfoil 21. The aerodynamic force 33 is resolved into a lift force 35 and a drag force 37. The lift force 35 is the component of the aerodynamic force 33 perpendicular to the relative wind 31. The drag force 37 is the component of the aerodynamic force 33 parallel to the relative wind 31.

Figure 2:
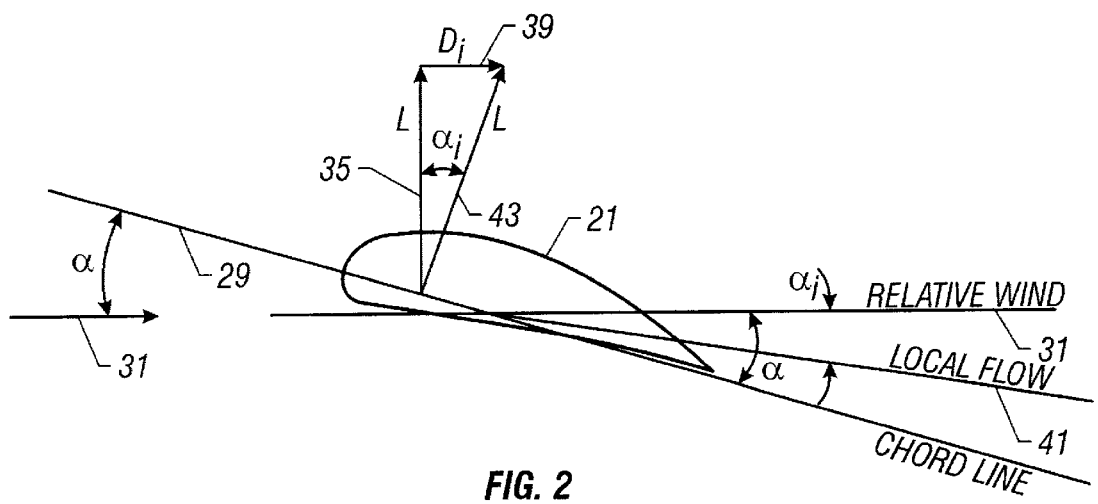
FIG. 2 (Prior Art) is a side view of the existing airfoil of FIG. 1 illustrating an induced drag force associated with the airfoil.

FIG. 2 is a side view of the existing airfoil 21 of FIG. 1 illustrating an induced drag force 39 associated with the airfoil 21. The total drag 37 illustrated in FIG. 1 includes a parasitic drag component and an induced drag component. As explained earlier, the parasitic drag is created by the disruption of airflow around the airfoil 21. The induced drag 39 is produced during the production of lift upon the airfoil 21. The greater the lift produced by the airfoil 21, the greater the induced drag 39.

A local flow 41 is created in the immediate vicinity of the airfoil 21, which is canted downward from the relative wind 31 by downwash. An induced angle of attack $\alpha_i$ is the difference between the local flow 41 and the angle of attack $\alpha$. Since the local flow 41 is inclined downward with respect to the relative wind 31, the lift vector remains perpendicular to the local flow 41. Therefore, the lift force 35 is shifted to a lift force (L') 43. With the rotation of the L' 43, induced drag 39 is created.

Designers of airfoils have increased the aerodynamic efficiency of wings in two ways. First, designers have sought ways to decrease parasitic drag upon airfoils. This has been accomplished in various ways, such as smoothing the surface skin of the airfoils. Second, designers have sought ways to increase the lifting properties of airfoils, through increased camber, or through the addition of lifting devices (e.g., flaps) without increasing the angle of attack. However, since a positive angle of attack exists, increasing the lift upon an airfoil still creates a corresponding increase in induced drag. It would be advantageous to design an airfoil which rotates the induced drag vector to a more beneficial direction, while still maintaining a high lifting force on the airfoil.

Figure 3:
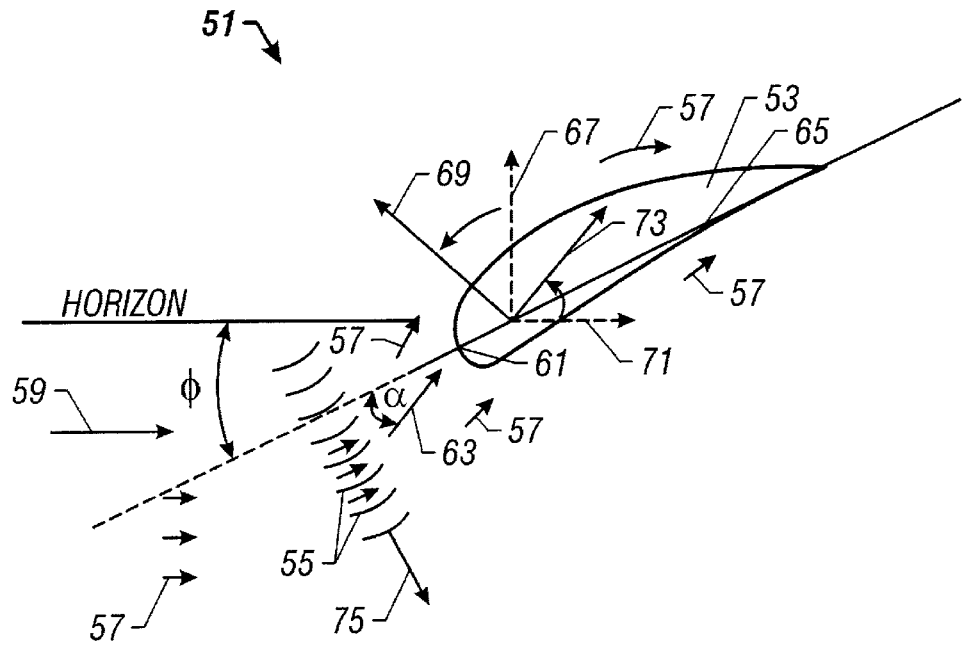
FIG. 3 is a side view of a first embodiment of a vane-airfoil combination illustrating the forces upon the vane-airfoil combination according to the teachings of the present invention.

FIG. 3 is a side view of a first embodiment of a vane-airfoil combination 51 illustrating the forces upon the vane-airfoil combination 51 according to the teachings of the present invention. The vane-airfoil combination 51 includes an airfoil 53 and a plurality of vanes 55. The vane-airfoil combination 51 travels with a forward velocity through a fluid, such as an airflow 57. The direction of the airflow 57 is a relative wind 59 and, as illustrated for simplicity, is parallel to the horizon. The airfoil 53 is rotated downwardly with an orientation angle $\phi$ in relation to the horizon. The plurality of vanes 55 is located in front of a leading edge 61 of the airfoil 53. Although FIG. 3 depicts the plurality of vanes 55 slightly below a leading edge of the airfoil 53, the plurality of vanes 55 may be positioned at other locations in front of the airfoil 53 to achieve different changes in the direction of flow of the airflow. The plurality of vanes 55 must only encounter the airflow 57 prior to the airfoil 53. Thus, as illustrated in FIG. 3, the airflow 57 first encounters the plurality of vanes 55, prior to flowing across the airfoil 53. The plurality of vanes 55 diverts the airflow 57, resulting in a shift of direction of the airflow 57 flowing across the airfoil 33 to a relative wind 63. A new angle of attack α is created between the airflow 57 and a chord line 65 of the airfoil 53. The new angle of attack α results in a shift forward of the total lift force 67 to a lift force 69. In addition, the total drag force 71 (including parasitic drag and induced drag) is shifted to a drag force 73.

Since the airfoil 53 is now at the angle of attack α, the lift force 69 direction now provides a forward (parallel) thrust component of force in relation to the relative wind 59 (horizon). The lift force 69 also includes a upward (perpendicular) force in relation to the relative wind 59 (in this example, the horizon). In addition, the drag force 73 now includes an upward lift component, perpendicular to the relative wind 59 (in this case, the horizon). The drag force 73 also includes a small drag component (not shown) which is parallel to the relative wind 59 (in this case, the horizon). The overall drag force parallel to the relative wind is reduced, since the drag force 73 has been rotated upwardly, resulting in the lift vector perpendicular to the relative wind 59. This drag force component decrease, parallel to the relative wind 59, is primarily accomplished by the rotation of the induced drag (produced by the lifting forces on the airfoil 53).

The rotation of the lift force 69 and drag force 73 is possible because of the plurality of vanes 55. The plurality of vanes 55 ensures that the airflow 59 flows at a desired optimum angle upon the airfoil 53. Without the plurality of vanes 55, the airflow 57 would impact the airfoil 53 at an undesirable angle (negative angle of attack α), resulting in a reduction of lift (or even a negative lift) and an increase in drag. As depicted in FIG. 3, the plurality of vanes 55 are arranged in a tandem order. In other embodiments, the vanes may be arranged adjacent to each other, in any formation which allows the airflow 57 to be diverted. The trailing vanes within the plurality of vanes 55 may be spaced and angled differently than the majority of vanes in order to reduce any eddy currents which may result from the airflow 57 flowing through the plurality of vanes 55.

In the preferred embodiment of the present invention, the plurality of vanes 55 are movably mounted. The angle of the plurality of vanes may be adjusted according to the orientation angle φ of the airfoil 53 to maintain a constant angle of attack α. The angle of the plurality of the vanes 55 can then be optimized to allow the airflow 57 to be diverted efficiently at a desired angle over the airfoil 53. The determination of the optimum angle of the plurality of vanes 55 can be made by a computer controlling the movement of the angle of the plurality of vanes 55. For example, if the orientation angle φ is decreased, the angle of the plurality of vanes 55 may be adjusted to efficiently divert the airflow 57 over the airfoil 53. If the orientation angle φ is increased, the angle of the plurality of vanes 55 would change to divert the airflow 57 to maintain a constant angle of attack α.

In another embodiment, the angle of the plurality of vanes 55 is fixed to allow optimized airflow over the airfoil 53 at a preset orientation angle φ. The airflow 57 across the plurality of vanes 55 also results in a downward aft vane force 75. This vane force 75 is small in comparison to the upward forces generated by the lift force 69 and the drag force 73.

In addition, the angle of the plurality of vanes 55 can be changed to provide a control surface for the airfoil 53. For example, the plurality of vanes 55 may be flexed to provide variation in the direction of the relative wind 63 across the length of the plurality of vanes 55. The variation in the direction of the relative wind 63 may produce a lift force 69 and a drag force 73 in a skewed direction. This skewed direction may be used to steer the airfoil 53.

Figure 4:
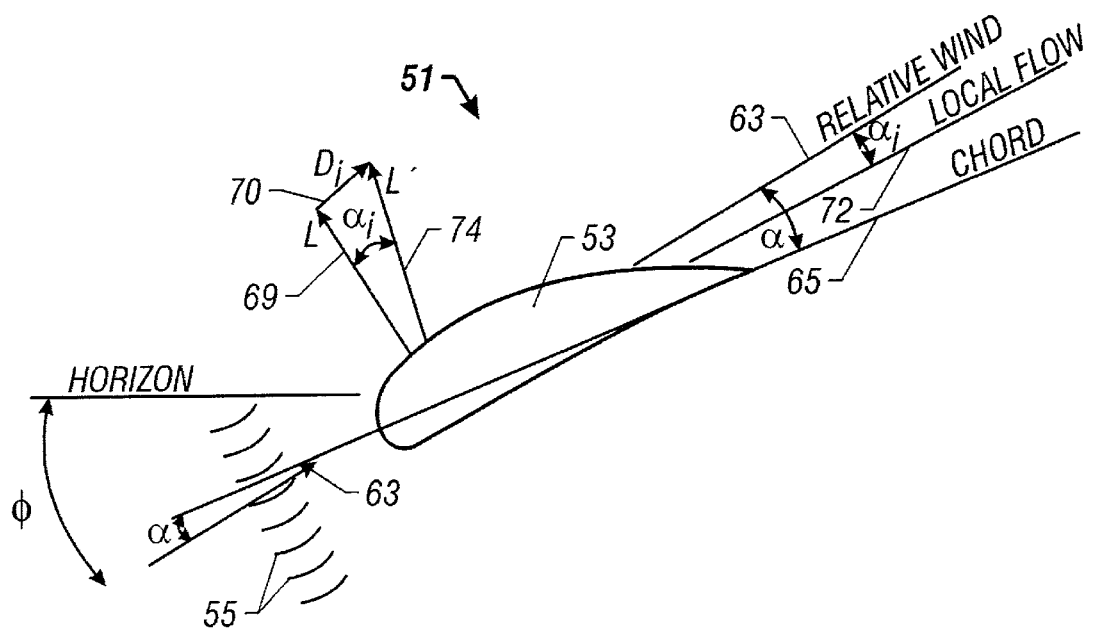
FIG. 4 is a side view of the vane-airfoil combination of FIG. 3 illustrating an induced drag force associated with the airfoil.

FIG. 4 is a side view of the vane-airfoil combination 51 of FIG. 3 illustrating an induced drag force 70 associated with the airfoil 53. In FIG. 4, the induced drag force 70 is illustrated. As discussed in FIG. 2, the induced drag 70 is produced during the production of lift upon the airfoil 53.

A local flow 72 is created in the immediate vicinity of the airfoil 53, which is canted downward from the relative wind 63 by downwash. An induced angle of attack $α_i$ is the difference between the local flow 72 and the angle of attach α. The lift force 89 is shifted to a lift force L' 74. Through the rotation of the L' 74, induced drag 70 is created. However, the induced drag 70 has rotated upward by modified relative wind 63. This upward rotation of the induced drag 70 provides a more beneficial positioning of the direction of the induced drag force. This new direction of the induced drag 70 now provides an upward lift component.

In operation, referring to FIG. 3, the airfoil 53 travels forward in a direction opposite of the relative wind 59. The airflow 57 first encounters the plurality of vanes 55, which diverts the airflow 57 towards the airfoil 53. While the airflow 57 travels through the plurality of vanes 55, a downward force 75 is created upon the plurality of vanes 55. The diverted airflow 57 flows across the airfoil 53 at an angle which allows the rotation or shifting of forces upon the airfoil 53. The lift force 67 is shifted to a lift force 69. The drag force 71 is shifted to a drag force 73.

Figure 5:
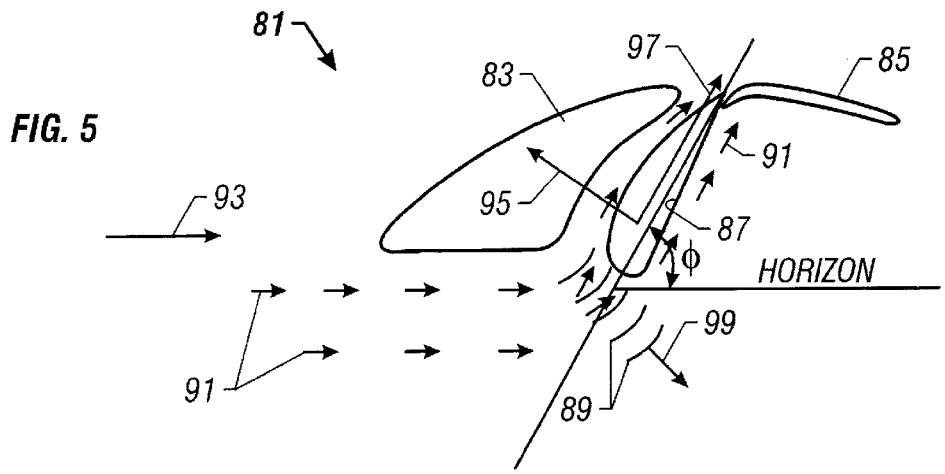
FIG. 5 is a side view of a second embodiment of a vane-airfoil combination having a fore-body and an after-body according to the teachings of the present invention.

FIG. 5 is a side view of a second embodiment of a vane-airfoil combination 81 having a fore-body 83 and an after-body 85 according to the teachings of the present invention. The vane-airfoil combination 81 includes an airfoil 87, a plurality of vanes 89, the fore-body 83 and the after-body 85. The vane-airfoil combination 81 operates through a fluid, such as an airflow 91, in a similar manner as described for the vane-airfoil combination 51, in a direction opposite a relative wind 93 which is, for simplicity, is parallel to the horizon.

However, the airfoil combination 81 includes the fore-body 83 positioned directly in front of the airfoil 87, as in relation to the oncoming airflow 91. The vane-airfoil combination 51 (FIG. 3) may create a high pressure region on the airfoil 53, especially at very high or low angles of attack. The addition of the fore-body 83 provides a means for deflecting any oncoming airflow 91 from hitting the airfoil 87 at an undesirable angle (negative angle of attack). The fore-body 83 deflects the airflow 91 around the airfoil 87. Without the fore-body 83, the airflow 91 would flow onto the airfoil 87 at an undesirable angle, resulting in a high pressure region on the upper portion of the airfoil 87, which leads to an unwanted increase in drag and a reduction in lift. The fore-body 83 depicted in FIG. 5 is only one example of any surface area which may be used to deflect the oncoming airflow 91. Many other shapes and designs may be utilized to reduce the pressure upon the upper portion of the airfoil 87. Since the fore-body 83 by its very nature requires a large surface area, the fore-body 83 may be ideally suited for use as a storage compartment, such as for passengers or cargo.

The vane-airfoil combination 81 may optionally include the after-body 85. The use of the after-body 85 may be used to efficiently bring the airflow 91 together on the backside of the airfoil 87, thus reducing any undesirable turbulence which may result from the separation of the airflow 91 from the airfoil 87. The after-body 85 illustrated in FIG. 5 is only an example, other shapes may be used to provide the airflow efficiency desired at the backside of the airfoil 85.

In operation, the vane-airfoil combination 81 moves forward through the airflow 91 in a opposite direction to the relative wind 93. The airflow 91 is first diverted by the fore-body 83. Upon the underside of the fore-body 83 and in front of the leading edge of the airfoil 87 is the plurality of vanes 89. The airfoil 87 is rotated forward to a negative orientation angle φ. The plurality of vanes 89 diverts the airflow 91 across the airfoil 87. As discussed in FIG. 3, the rotation of the airfoil 87 results in the rotation of a lift force 95 and a drag force 97, thus providing a more beneficial direction of the drag forces on the airfoil, while introducing a forward (thrust) component to the airfoil 87. With a change in the orientation angle φ of airfoil 53, the angle of the plurality of vanes 55 may be changed to provide a constant angle of attack α (not shown).

The placement and angle of the plurality of vanes 89, as well as the rotation of the airfoil 87, can determine the direction of the forces on the airfoil 87, as well as any downward vane force 99 on the plurality of vanes 89. For example, a larger downward force 99 may be desired, in addition to providing a reduction in the drag 97, without a desired increase in lift. This situation can be illustrated with an empty semi-truck. A low drag force is desired, however a downward force is also desired to prevent a back portion of the truck from skipping across the road. Therefore, the placement of the plurality of vanes 89 would be optimized to increase the downward vane force 99, thus preventing the truck from skipping along the road.

Figure 6:
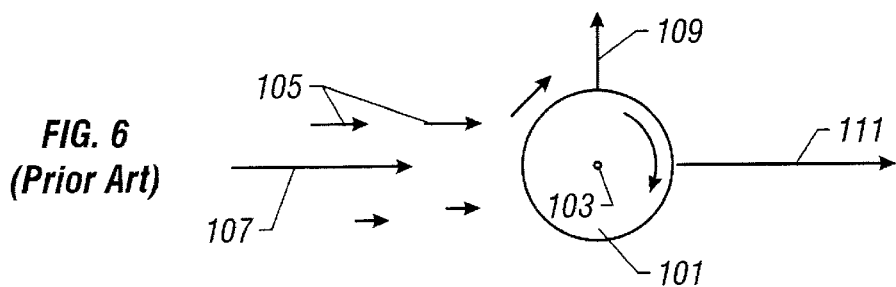
FIG. 6 (Prior Art) is a side view of an existing rotating cylinder illustrating aerodynamic forces associated with the cylinder moving through a fluid.

FIG. 6 is a side view of an existing rotating cylinder 101 illustrating aerodynamic forces associated with the cylinder 101 moving through a fluid. The rotating cylinder 101 rotates about a center of axis 103 as illustrated in FIG. 5. The rotating cylinder 101 travels through a fluid, such as an airflow 105 in a direction opposite of a relative wind 107. The rotation of the cylinder 101 accelerates the airflow 105 on an upper portion of the cylinder 101. The increased velocity of the airflow 105 results in a lower pressure on the top portion of the cylinder 101 in relation to a lower portion of the cylinder 101. The decreased pressure on the upper portion of the cylinder 101 produces a net positive lift force 109. This lift force 109 is well known to those skilled in the art of airfoil design and is commonly referred to as the Magnus effect. However, a major disadvantage with this airfoil design is that a large drag force 111 is produced. This large drag force 111 has made it impractical, up to this point, to utilize this airfoil design in vehicles or aircraft.

Figure 7:
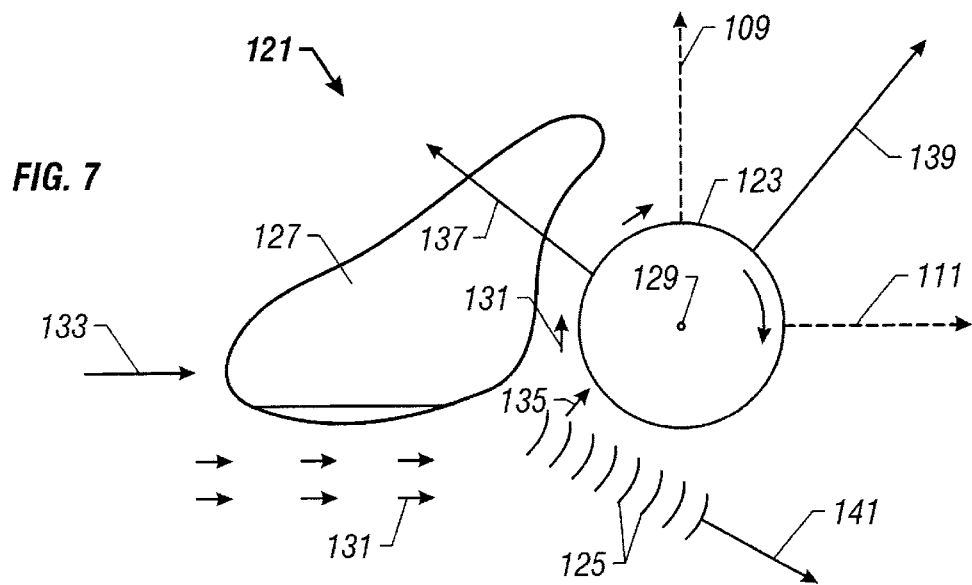
FIG. 7 is a side view of a vane-airfoil combination in a third embodiment of the present invention.

FIG. 7 is a side view of a vane-airfoil combination 121 in a third embodiment of the present invention. In this embodiment, a rotating cylinder 123 is utilized as the primary airfoil. The vane-airfoil combination 121 includes a plurality of vanes 125, and an optional fore-body 127. The fore-body 127 may be constructed as a cockpit or cabin for carrying passengers or cargo in an aircraft.

The rotating cylinder 123 rotates about a center axis of the rotating cylinder 129 by a mechanism, such as an engine, providing a rotation as illustrated in FIG. 6. The rotating cylinder 123 travels through a fluid, such as an airflow 131 in a direction opposite of a relative wind 133. The plurality of vanes 125, located forward of the rotating cylinder 123, diverts the airflow 131 across the rotating cylinder 123 to a new relative wind 135. Since the airflow 131 now encounters the rotating cylinder 123 from a different direction, forces associated with the rotating cylinder are shifted to a different direction.

As depicted in FIG. 7, the plurality of vanes 125 are arranged in a tandem order. In other embodiments, the vanes may be arranged adjacent to each other, or in any formation which allows the airflow 131 to be diverted. The trailing vanes within the plurality of vanes 125 may be spaced and angled differently than the majority of vanes, in order to reduce any eddy currents which may result from the airflow 131 through the plurality of vanes 125. Additionally, the angle of the vanes may be optimized to allow the airflow 131 to be diverted efficiently by rotating the vanes at different angles as described in FIG. 3. The angle of the vanes may also be flexed, resulting in a variation of the aerodynamic forces across the length of the rotating cylinder 123, thereby providing a control surface for the vane-airfoil combination 121.

With the shifting of the airflow 131, the lift force 109 also shifts its direction forward to a lift force 137. By rotating the lift force forward, lift force 137 now includes a forward thrust component (not shown) and an upward lift component (not shown). The drag force 111 is also shifted to a drag force 139. The drag force 139 now includes an upward lift component (not shown), as well as a smaller overall drag component (not shown). A downward aft force 141 is also exerted by the airflow 131 flowing across the plurality of vanes 125.

Figure 8:
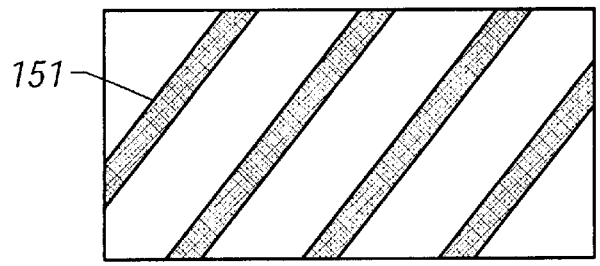
FIG. 8 illustrates the surface of the rotating cylinder of FIG. 7 with a helical pattern.
Figure 9:
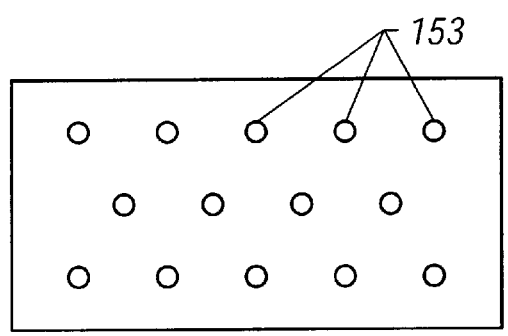
FIG. 9 illustrates the surface of the rotating cylinder of FIG. 7 with a plurality of dimples.
Figure 10:
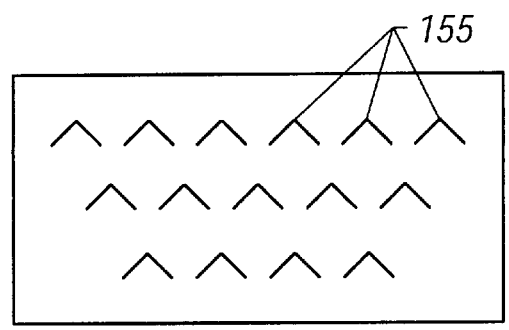
FIG. 10 illustrates the surface of the rotating cylinder of FIG. 7 with a raised dot pattern.

The shift in direction of the forces significantly reduces the negative effect of the high drag forces of a rotating cylinder. The surface of the rotating cylinder 123 may also be roughened by various means, which may enhance the lifting characteristics of the rotating cylinder 123. For example, the surface of the rotating cylinder 123 may be carved with a helical pattern to enhance the lifting efficiency of the rotating cylinder 123. The helical pattern may be a carved trough below the surface of the cylinder or a raised ridge. FIG. 8 illustrates the surface of the rotating cylinder 123 of FIG. 7 with a helical pattern 151. In another embodiment, depressed dimples (i.e., pits) may be imprinted into the surface of the rotating cylinder 123. FIG. 9 illustrates the surface of the rotating cylinder 123 of FIG. 7 with a plurality of dimples 153. In still another embodiment, the surface of the rotating cylinder may include a pattern of raised dots. FIG. 10 illustrates the surface of the rotating cylinder 123 of FIG. 7 with a raised dot pattern 155.

Referring to FIG. 7, the present invention may also include the fore-body 127, positioned in front of the rotating cylinder 123. The fore-body 127 may provide an efficient means for diverting the airflow 131 towards the plurality of vanes 125 and above an upper portion of the cylinder 123. In addition, the fore-body 127 may be used as a storage area, such as a cabin for passenger in a vehicle utilizing the vane-airfoil combination 121. Since the fore-body 127 would require a large surface area, the inclusion of a cabin would be a highly beneficial and productive utilization of the space.

Figure 11:
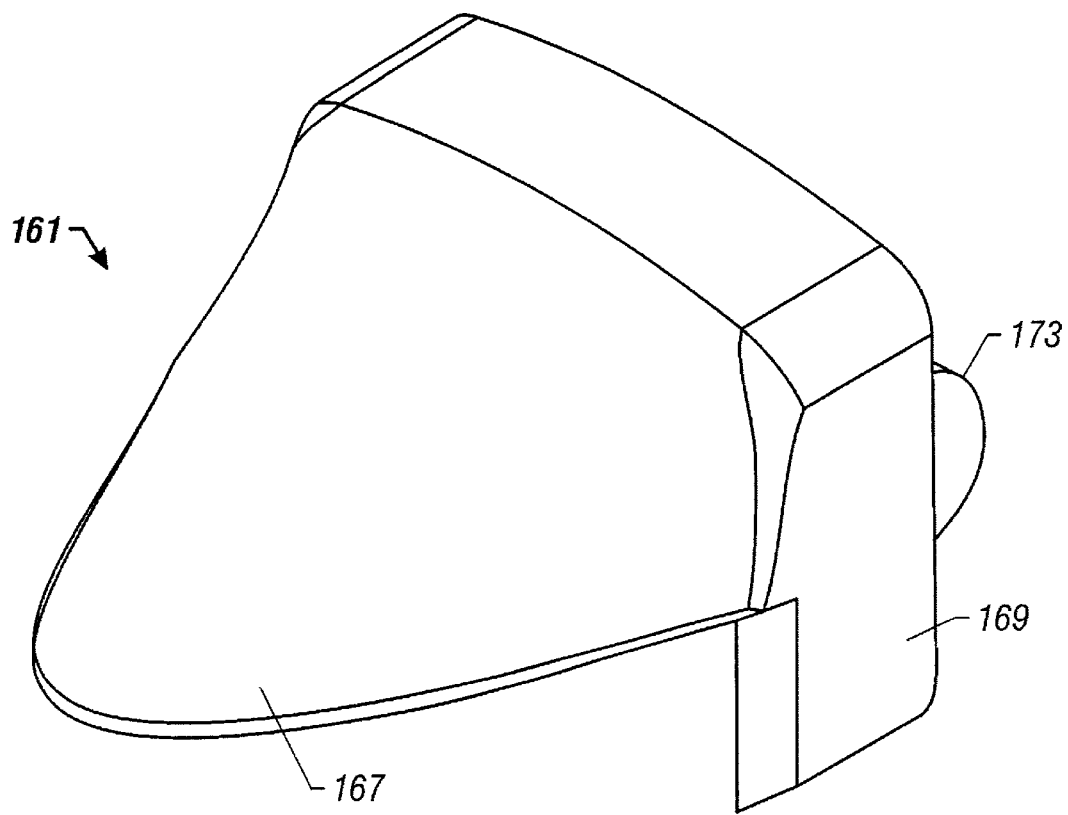
FIG. 11 is a front perspective view of a vane-airfoil combination in a fourth embodiment of present invention.

FIG. 11 is a front perspective view of a vane-airfoil combination 161 in a fourth embodiment of present invention. The vane-airfoil combination 161 includes a fore-body 167 having side portions 169 and a rotating cylinder 173.

Figure 12:
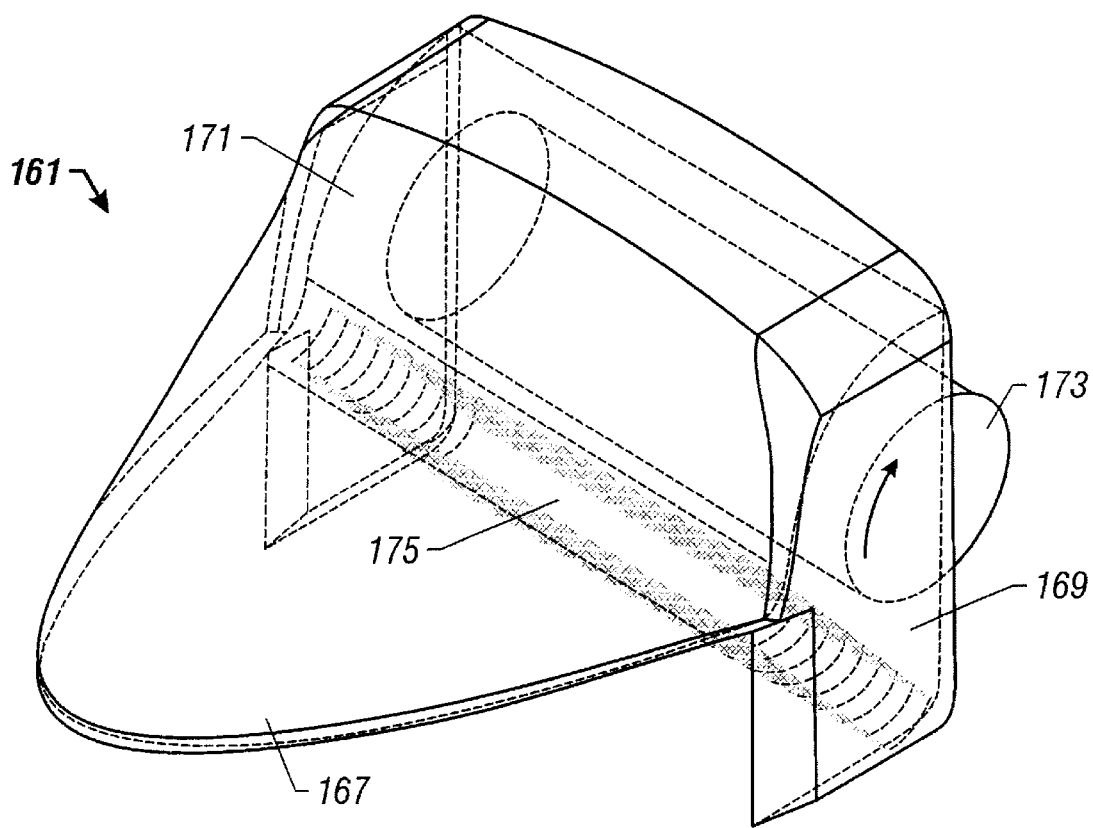
FIG. 12 is a front perspective view of the vane-airfoil combination of FIG. 11 illustrating the rotating cylinder and other internal components in phantom.

FIG. 12 is a front perspective view of the vane-airfoil combination of FIG. 11 illustrating the rotating cylinder 173 and other internal components in phantom. The fore-body 167 is located in front of the rotating cylinder 173 and a plurality of vanes 175. The fore-body 167 differs from fore-body 127 of FIG. 7 in that the bottom of fore-body 167 is open to the air flow. However, the fore-body 167 also includes the side portions 169 and 171 to reduce any airflow over the ends of the rotating cylinder 173.

Figure 13:
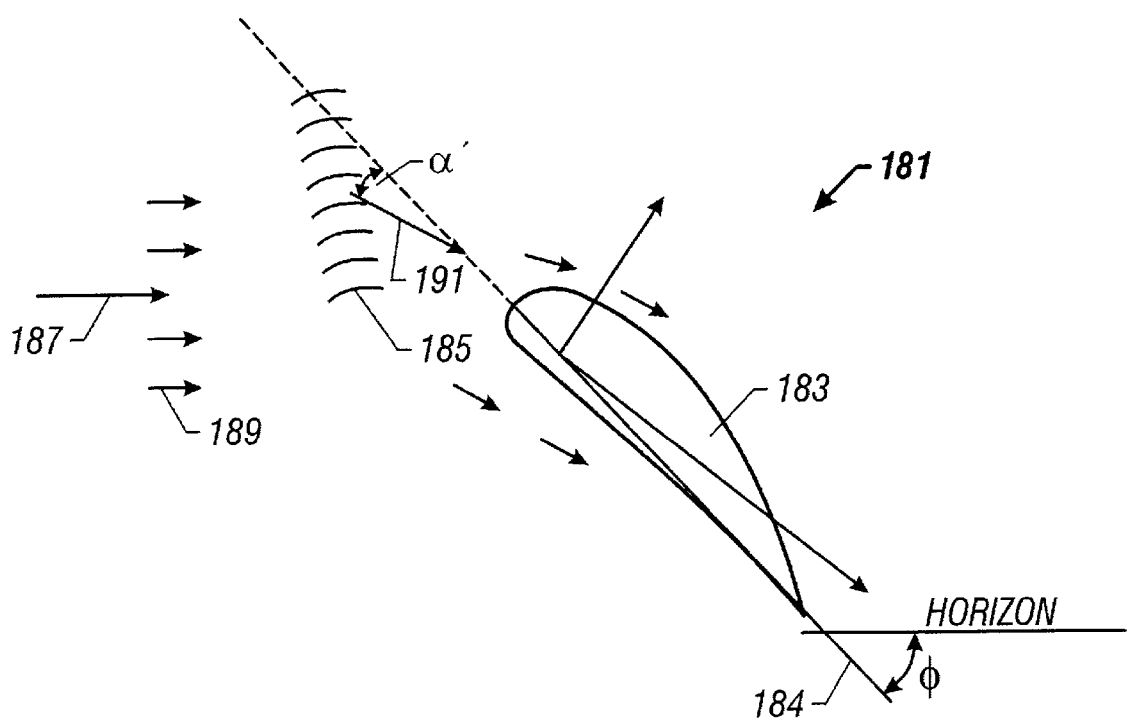
FIG. 13 is a side view of a fourth embodiment of a vane-airfoil combination illustrating the forces upon the vane-airfoil combination according to the teachings of the present invention.

FIG. 13 is a side view of a fourth embodiment of a vane-airfoil combination 181 illustrating the forces upon the vane-airfoil combination 181 according to the teachings of the present invention. The vane-airfoil combination 181 includes an airfoil 183 and a plurality of vanes 185. In this embodiment, the airfoil 183 is at a high orientation angle φ as defined by a chord line 184 and the horizon. For simplicity, the horizon is parallel to an airflow 189. At a high orientation angle φ, lifting forces associated with the airfoil 183 may be reduced during stall conditions, such as when the airflow 189 would separate from the airfoil 183. To prevent this situation, the plurality of vanes 185 can divert the airflow 189 to present an effective angle of attack α. At this new reduced angle of attack, defined between the new diverted relative wind 191 and the chord line 184 of the airfoil 183, a stall may be prevented.

The positioning of the plurality of vanes 185 is changed to an uppermost and forward position in relation to the airfoil 183. The angle of the vanes may be fixed or rotatably movable. If the angle of the vanes is movable, the vanes may be adjusted, as discussed in FIG. 3, to provide a constant effective angle of attack α.

The primary objective in a high orientation angle φ situation, as shown in FIG. 13, is to prevent a stall or increase or stabilize the lifting forces on the airfoil 183. In operation, the airflow 189 first encounters the plurality of vanes 185. The airflow 189 is then diverted to present a new effective angle of attack α, thereby preventing the likelihood of a stall.

Although a conventional airfoil (FIG. 5) and a rotating cylinder (FIG. 7) have been illustrated and explained, other types of airfoils may be used in the vane-airfoil combination. For example, different shapes and sizes of airfoils may be used, such as spheroid or by using a Kline-Fogleman airfoil. Additionally, a plurality of airfoils may be utilized with a plurality of vanes in the vane-airfoil combination.

The vane-airfoil combination provides many advantages over existing airfoils. The vane-airfoil combination produces a thrust component force from the shifted lift force. This thrust may be useful in assisting in propelling a vehicle, such as an aircraft or ground vehicle. The drag force component is reduced by shifting the force direction upwardly, thus producing a lifting force. This lifting force may be useful in an aircraft, where an increased lifting capability is always desired. With the addition of a fore-body, a passenger or storage compartment is provided, while simultaneously increasing the efficiency of the vane-airfoil combination. In addition, the vane-airfoil combination may be used as an anti-stall device during high angle of attack situations.

The vane-airfoil combination also offers a practical means for utilizing a rotating cylinder. The rotating cylinder can now be used in a vehicle, thus providing tremendous lifting capability, as well as a thrust force, by shifting the direction of the aerodynamic forces on the rotating cylinder.

It is thus believed that the operation and construction of the present invention will be apparent from the foregoing description. While the apparatus shown and described has been characterized as being preferred, it will be readily apparent that various changes and modifications could be made therein without departing from the scope of the invention as defined in the following claims.

What is claimed is:

1. An apparatus for altering a flow of a fluid stream around an airfoil, said apparatus comprising:

an airfoil having an orientation angle relative to the horizon and an angle of attack relative to the fluid stream; and a plurality of vanes movably mounted in front of the airfoil which divert the fluid stream to change the angle of attack of the airfoil.

2. The apparatus of claim 1 wherein as the orientation angle of the airfoil is changed, the plurality of vanes divert the fluid stream to maintain a constant angle of attack.

3. The apparatus of claim 1 wherein as the orientation angle of the airfoil is decreased, the plurality of vanes divert the fluid stream to maintain a constant angle of attack.

4. The apparatus of claim 1 wherein the plurality of vanes are flexed to provide a controlling surface for steering the apparatus.

5. The apparatus of claim 1 wherein as the orientation angle of the airfoil is changed, the plurality of vanes divert the fluid stream so that the angle of attack changes by a lesser amount.

6. The apparatus of claim 5 wherein as the orientation angle of the airfoil is decreased, the plurality of vanes divert the fluid stream so that the angle of attack decreases by a lesser amount.

7. The apparatus of claim 5 wherein as the orientation angle of the airfoil is increased, the plurality of vanes divert the fluid stream so that the angle of attack decreases by a lesser amount.

8. The apparatus of claim 1 further comprising a fore-body mounted in front of the plurality of vanes which diverts the fluid stream around the airfoil.

9. The apparatus of claim 8 wherein the fore-body includes an interior compartment for carrying at least one passenger.

10. The apparatus of claim 8 wherein the fore-body includes an interior compartment for carrying cargo.

11. The apparatus of claim 1 wherein the plurality of vanes are axially aligned and mounted parallel to the leading edge of the airfoil.

12. The apparatus of claim 11 wherein the plurality of vanes are rotatably mounted and by rotating the vanes, the angle of attack of the airfoil changes without changing the orientation angle.

13. The apparatus of claim 1 further comprising an after-body mounted in back of the airfoil which streamlines the fluid stream behind the airfoil.

14. The apparatus of claim 1 wherein the airfoil is a rotating cylinder, and the apparatus includes means for rotating the cylinder around a central axis thereof.

15. The apparatus of claim 14 wherein the surface of the rotating cylinder includes an irregular pattern selected for the group consisting of:

a helical pattern;

a raised dot pattern; and a depressed dimple pattern.

16. An apparatus for altering a flow of a fluid stream around an airfoil, said apparatus comprising:

an airfoil having an orientation angle relative to the horizon and an angle of attack relative to the fluid stream;

a plurality of vanes axially aligned and rotatably mounted parallel to the leading edge of the airfoil, said vanes rotating to divert the fluid stream to change the angle of attack of the airfoil; and a fore-body mounted in front of the plurality of vanes which diverts the fluid stream onto the plurality of vanes.

17. The apparatus of claim 16 wherein the plurality of vanes rotates to change the angle of attack of the airfoil without changing the orientation angle.

18. The apparatus of claim 16 further comprising an after-body mounted in back of the airfoil which streamlines the fluid stream behind the airfoil.

19. The apparatus of claim 16 wherein the airfoil is a rotating cylinder, and the apparatus includes means for rotating the cylinder around a central axis thereof.

20. An apparatus for altering a flow of a fluid stream around an airfoil, said apparatus comprising:

an airfoil having an orientation angle relative to the horizon and an angle of attack relative to the fluid stream;

a plurality of vanes axially aligned and rotatably mounted parallel to the leading edge of the airfoil, said vanes rotating to maintain a constant angle of attack of the airfoil when the orientation angle changes; and an after-body mounted in back of the airfoil which streamlines the fluid stream behind the airfoil.

21. An apparatus for altering a flow of a fluid stream around an airfoil, said apparatus comprising:

an airfoil having an orientation angle relative to the horizon and an angle of attack relative to the fluid stream; and a plurality of vanes mounted in front of the airfoil which divert the fluid stream to change the angle of attack of the airfoil.

\* \* \* \* \*